US010757958B2

(12) United States Patent
Williams et al.

(10) Patent No.: US 10,757,958 B2
(45) Date of Patent: Sep. 1, 2020

(54) FEED COMPONENTS AND METHOD FOR MAKING AND USING

(71) Applicant: Richfeed LLC, Fulda, MN (US)

(72) Inventors: Rodney L. Williams, Fulda, MN (US); Tyson B. Williams, Fulda, MN (US)

(73) Assignee: Richfeed LLC, Fulda, MN (US)

( * ) Notice: Subject to any disclaimer, the term of this patent is extended or adjusted under 35 U.S.C. 154(b) by 468 days.

(21) Appl. No.: 15/259,870

(22) Filed: Sep. 8, 2016

(65) Prior Publication Data

US 2016/0374365 A1    Dec. 29, 2016

Related U.S. Application Data

(63) Continuation of application No. PCT/US2015/019934, filed on Mar. 11, 2015.

(60) Provisional application No. 61/951,331, filed on Mar. 11, 2014.

(51) Int. Cl.
*A23K 10/38* (2016.01)
*A23K 50/10* (2016.01)
*A23K 50/75* (2016.01)
*A23K 50/30* (2016.01)

(52) U.S. Cl.
CPC .............. *A23K 10/38* (2016.05); *A23K 50/10* (2016.05); *A23K 50/30* (2016.05); *A23K 50/75* (2016.05); *Y02P 60/873* (2015.11)

(58) Field of Classification Search
CPC ................................ A23K 50/30; A23K 10/38
See application file for complete search history.

(56) References Cited

U.S. PATENT DOCUMENTS 7,935,371 B2     5/2011  Prevost et al.
2012/0263837 A1*  10/2012  Coles ................. A23K 10/38
                                              426/231

FOREIGN PATENT DOCUMENTS

CN          103355534 A    10/2013
WO      WO 2003/015532    2/2003

OTHER PUBLICATIONS

Shurson, Jerry. "What we know about feeding liquid by-products to pigs". Available online as of Feb. 25, 2009 from https://thepigsite.com. pp. 1-17. (Year: 2009).*
Han, et al. "Changes in Composition and amino acid profile during dry grind ethanol processing from corn and estimation of yeast contribution toward DDGS proteins". J Agric. Food Chem. 2010, 58, 3430-3437. (Year: 2010).*
Luthria et al., "Changes in phenolic acid content during dry-grind processing of corn into ethanol and DDGS," *Journal of the Science of Food and Agriculture* 94(9):1723-1728, Dec. 23, 2013.

(Continued)

*Primary Examiner* — Jenna A Watts
(74) *Attorney, Agent, or Firm* — Klarquist Sparkman, LLP

(57) ABSTRACT

Embodiments of a feed composition for a subject, particularly livestock animals, such as porcines, and a method of making and using the feed composition are disclosed. In one embodiment, the composition comprises a combination of corn condensed distillers' soluble (CCDS) and corn distillers' whole stillage (CDWS) in a weight ratio within the range of from about 20% CCDS and about 80% CDWS to about 45% CCDS and about 55% CDWS, inclusive of all weight ratios within this range. The composition may further comprise one or more additional feed components.

20 Claims, 1 Drawing Sheet

(56) References Cited

OTHER PUBLICATIONS

International Search Report dated May 28, 2015 from International Application No. PCT/US2015/019934.

Koeln et al., "Maize whole stillage as a supplemental protein source for growing lambs and finishing steers," *Animal Feed Science and Technology* 11(3):181-187, Sep. 1, 1984.

Mustafa et al., "The Nutritive Value of Thin Stillage and Wet Distillers' Grains for Ruminants," *Asian-Australasian Journal of Animal Sciences* 13(11)1609-1618, 2000.

Sasikala-Appukuttan et al., "The Feeding Value of Corn Distillers Solubles for Lactating Dairy Cows," *Journal of Dairy Science* 91(1):279-287, Jan. 1, 2008.

\* cited by examiner

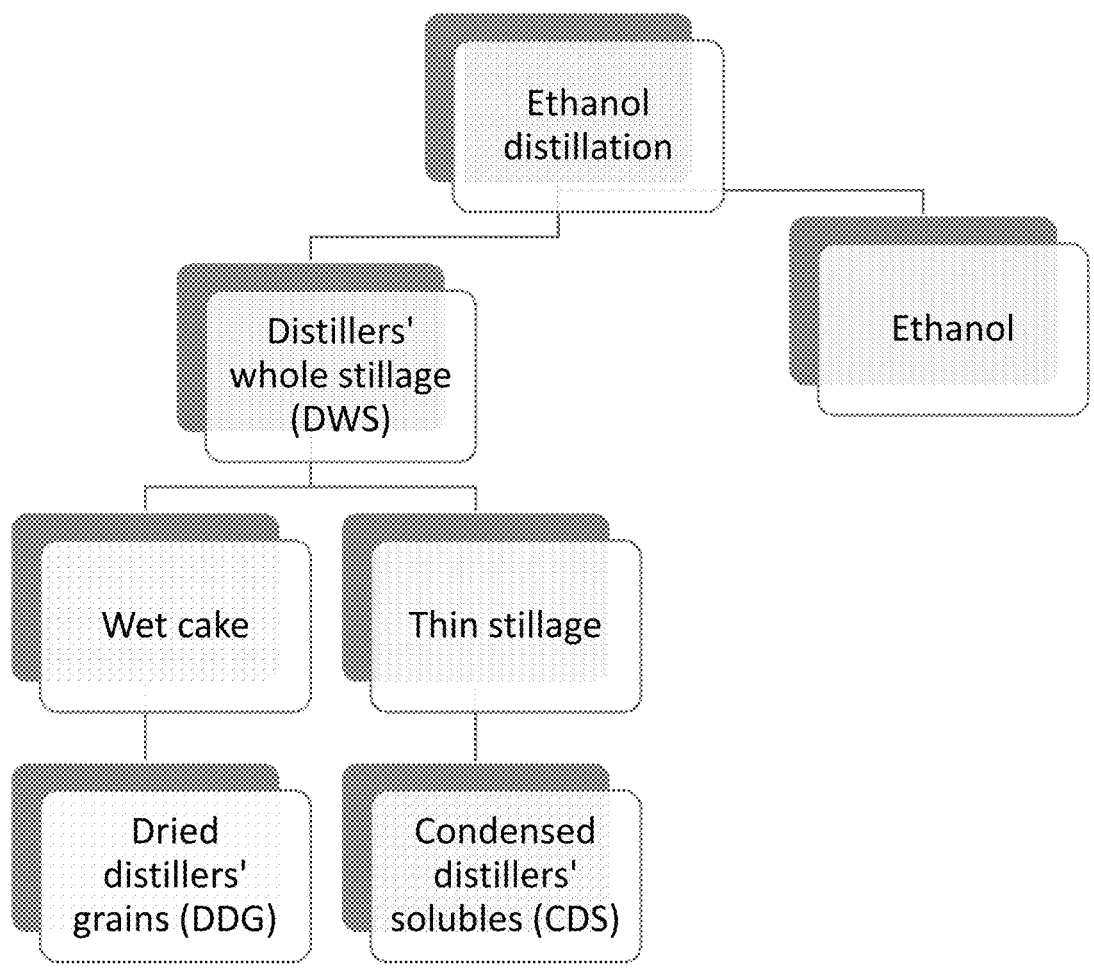

FEED COMPONENTS AND METHOD FOR MAKING AND USING

CROSS REFERENCE TO RELATED APPLICATION

The present application is a continuation of International Application No. PCT/US2015/019934, filed on Mar. 11, 2015, which claims the benefit of the Mar. 11, 2014, earlier filing date of U.S. provisional application No. 61/951,331, both of which prior applications are incorporated herein by reference in their entirety.

FIELD

This disclosure concerns feed for livestock. The disclosure pertains to components of the feed, embodiments of a method for preparing the components, and embodiments of a method for feeding livestock using the feed.

BACKGROUND

Mustafa et al. ("The nutritive value of thin stillage and wet distillers' grains for ruminants" *Asian-Aus. J. Anim. Sci.*, 2000, 13(11):1609-1618) disclose using thin stillage alone or in combination with distillers' grains as feed components for ruminants.

Ham et al. ("Wet corn distillers byproducts compared with dried corn distillers grains with soluble as a source of protein and energy for ruminants" *J. Anim. Sci.*, 1994, 72:3246-3257) disclose feeding calves with wet distillers' byproducts (wet distillers' grains+thin stillage, or WDB) and composites of dried distillers' grains+soluble (DDGS). They further describe a trial with steers treated with combinations of WDG (wet distillers' grains)+CDS via plastisol cannulas in the rumen.

Sasikala-Appukuttan et al. ("The feeding value of corn distiller's solubles for lactating dairy cows" 2008, *J. Dairy Sci.*, 91:279-287) reported results associated with feeding lactating dairy cows 10% corn condensed distiller's solubles (CCDS) with 18.5% distillers' dried grains with soluble (DDGS). They suggest that CCDS is comparable to DDGS in replacing soybean meal and corn grain within a total mixed ration.

Squire et al. ("Condensed corn distillers' solubles in swine liquid feeding: growth performance and carcass quality" 2005, *J. Animal Sci.*, 83(Supplement 1):165) and de Lange et al. ("Swine liquid feeding: Nutritional considerations" Presentation at the 2006 Western Nutrition Conference; Winnipeg, MB, Canada; pages 1-13) discuss liquid feeding swine and administering condensed corn distiller's solubles ("CDS") in feedstuff for swine liquid feeding. Squire et al. reported that "[f]eeding CDS reduced growth rates and daily feed intake as compared to the control."

The citation of documents herein should not be construed as an admission that any is relevant prior art.

SUMMARY

Certain disclosed embodiments concern a combination of condensed distillers' soluble (CDS) and distillers' whole stillage (DWS) as a feed component, or nutrition, provided to livestock. The nutrition may be provided to livestock in any suitable form, such as a feedstuff, a total mixed ration, feedstock, or other form now known to a person of ordinary skill in the art or hereafter discovered. In many cases, the CDS is corn condensed distillers' soluble (CCDS) and the DWS is corn distillers' whole stillage and/or corn distillers' thin stillage (CDWS).

In one aspect, the disclosure provides embodiments of a composition comprising a combination of CDS and DWS that may be added to other feed materials or nutrients supplied to livestock. In certain disclosed embodiments these two materials are present in the composition in a specific ratio relative to each other. In some cases, the CDS is corn condensed distillers' soluble (CCDS). In other cases, the DWS is corn distillers' whole stillage (CDWS). In additional embodiments, a composition comprising a combination of CCDS and CDWS is disclosed. CCDS and CDWS are used as representative and non-limiting examples herein.

One exemplary disclosed combination of CCDS and DWS includes the two components in a range of ratios, where the ratio is the amount of one component relative to each other. Stated differently, the amounts of the two components total to 100% of the combination. This is regardless of whether the combination is present in a composition containing other components. As described herein, the ratio of components CCDS and CDWS ranges (or is within the range) of from about 20% CCDS to about 80% CDWS to about 45% CCDS to about 55% CDWS, inclusive of the end points and all weight ratios within this range. While component ratios are stated herein typically by weight, a person of ordinary skill in the art will appreciate that the weight ratios also could be expressed as equivalent volume ratios.

In some disclosed exemplary embodiments, the composition may comprise a combination of CCDS and CDWS, where the ratio of CCDS to CDWS, in the combination, ranges (or is within the range) of from about 20% CCDS and about 80% CDWS to about 45% CCDS and about 55% CDWS, inclusive of the end points and all weight ratios within this range. The composition may, of course, optionally contain one or more other components. Non-limiting examples include one or more components suitable for inclusion in animal feed or feedstock, including both liquid and dry components. Examples of such additional components include corn, soybean, barley, wheat, meals, whey, fish meal, fish oil, soybean oil, corn oil, limestone, dried distillers' grain, potato mash, beer, sugar cane water, restaurant waste, ice cream, and other feed supplements, such as vitamins, minerals, dicalcium phosphate, amino acids, such as lysine, threonine and tryptophan, therapeutics, growth promotants, etc., and any and all combinations thereof.

In another aspect, the disclosure provides a method of providing nutrition to a subject, such as an animal raised as livestock as a non-limiting example. For example, the subject may be porcine (pig), bovine (cattle and bison), ovine (sheep or goat) or avian (poultry, such as chicken, geese and turkey). The method may comprise oral administration of a composition containing a combination of CCDS and CDWS as disclosed herein.

In some embodiments, the disclosed method may comprise repetitive administration of a disclosed composition or compositions. As a non-limiting example, a disclosed composition comprising a combination of CCDS and CDWS may be administered by liquid feeding as known to a person of ordinary skill in the art, such as by using mechanized delivery systems. In other embodiments, the administration is repeated one or more times to a subject. In further embodiments, the repeated administration may be the same composition, or one or more administrations may be of a composition that has a different, but disclosed, combination of CCDS and CDWS from a combination previously administered to the livestock.

In a further aspect, the disclosure provides a second method of providing nutrition to a disclosed subject. The method may comprise administering two or more compositions comprising CCDS and CDWS to the subject where the two or more compositions together provide to the subject a ratio of CCDS and CDWS that ranges from about 20% CCDS and about 80% CDWS to about 45% CCDS and about 55% CDWS, inclusive of the end points and all weight ratios within this range.

In some embodiments, the method includes administering a first composition comprising CCDS and CDWS at a first ratio and a second composition comprising CCDS and CDWS at a second ratio different from the first ratio. In some cases, the first and second compositions are selected from the compositions disclosed herein. In other cases, the first ratio of CCDS and CDWS is within the range from about 20% CCDS and about 80% CDWS to about 30% CCDS and about 70% CDWS, inclusive of the end points and all weight ratios within this range; and the second ratio is within the range from about 35% CCDS and about 65% CDWS to about 45% CCDS and about 55% CDWS, inclusive of the end points and all weight ratios within this range. In some embodiments, the first ratio of CCDS and CDWS is within the range from about 25% CCDS and about 75% CDWS to about 30% CCDS and about 70% CDWS, inclusive of the end points and all weight ratios within this range; and the second ratio is within the range from about 35% CCDS and about 65% CDWS to about 40% CCDS and about 60% CDWS, inclusive of the end points and all weight ratios within this range. Disclosed embodiments may be administered to livestock by any suitable method. Certain disclosed embodiments concern administering compositions to livestock by liquid feeding, as described herein, optionally using mechanized delivery systems.

In a fourth aspect, disclosed embodiments provide a method of preparing a composition as disclosed herein. The method may comprise combining CCDS and CDWS to a ratio of CCDS and CDWS that ranges from about 20% CCDS and about 80% CDWS to about 45% CCDS and about 55% CDWS, inclusive of the end points and all weight ratios within this range.

BRIEF DESCRIPTION OF THE FIGURE

FIG. 1 illustrates a process whereby CDS and DWS is formed from plant material used in ethanol production.

DETAILED DESCRIPTION

A. General

The disclosure is based on the residual products obtained following fermentation of plant material used for the distillation of ethanol. FIG. 1 shows a series of steps following the distillation of ethanol from fermented plant material. The distillation process produces ethanol, which is collected, and a residual liquid known as distillers' whole stillage (DWS). DWS is known to contain water, fiber, protein, and lipids. Centrifugation, or other separation techniques, may be applied to DWS to produce solids (wet cake) and a liquid fraction known as thin stillage.

The wet cake may be dried to produce dried distillers' grains (DDG), while the water content of thin stillage may be reduced, such as by evaporation, to produce condensed distillers' solubles (CDS), which is a liquid. In many cases, CDS is prepared by concentrating the thin stillage by evaporation to produce a solids content of greater than 0% to at least about 30% solids. It is further possible to combine DDG with CDS to form dried distillers' grains soluble (DDGS). However, the preparation of DDGS does not reconstitute DWS in terms of volume (due to water loss) or composition (due to loss of factors present in DWS during the multiple processing steps).

The disclosure is based in part on the discovery and recognition of using a combination of CDS and DWS, at a relative amount-to-amount basis, typically stated as a weight-to-weight basis, as a component of feed or nutritional matter for animals. Using CCDS and CDWS as non-limiting examples, the disclosure is suitable for liquid feeding methods known to a person of ordinary skill in the art. For example, CCDS is suitable for combination with the approximately 85-90% liquid content in CDWS to form a flowable liquid that may be combined with other materials for liquid feeding. As one non-limiting example, the combination of CCDS and CDWS may be a component in a composition that also comprises additional water and dry matter, such as dry matter suitable as a feed. In other examples, the combination of CCDS and CDWS may be a component in a larger composition that also comprises dry matter, such as dry matter suitable as a feed, for administration to a subject largely as a solid. These compositions are within the scope of the disclosure, as the combination of CCDS and CDWS remains within the range of disclosed ratios, relative to each other, while present in the larger composition.

B. Embodiments of Disclosed Compositions

Disclosed composition embodiments contain a combination of corn condensed distillers' soluble (CCDS) and corn distillers' whole stillage (CDWS). The ratio of these two components typically is stated on a weight-to-weight basis, and ranges from about 20% CCDS and 80% about CDWS to about 45% CCDS and about 55% CDWS, inclusive of the end points and all weight ratios within this range. Table 1 presents exemplary CCDS:CDWS ratios of the disclosure.

TABLE 1

| | LOW CCDS/<br>HIGH CDWS | | | | | HIGH CCDS/<br>LOW CDWS |
|---|---|---|---|---|---|---|
| CCDS (%) | 20 | 25 | 30 | 35 | 40 | 45 |
| CDWS (%) | 80 | 75 | 70 | 65 | 60 | 55 |

As evident from Table 1, the expressed ratio of the two components total "100%" because the individual percentages of CCDS and CDWS are expressed relative to the combination of the two components.

One exemplary embodiment of liquid feed CCDS had the chemical analysis provided by Tables 2 and 3.

TABLE 2

| Liquid Feed CCDS Analysis | | |
|---|---|---|
| TEST | RESULTS<br>AS RECEIVED | RESULTS<br>DRY WEIGHT |
| Moisture (%) | 66.55 | — |
| Dry Matter (%) | 33.45 | — |
| Ash (%) | 2.99 | 8.94 |

TABLE 2-continued

Liquid Feed CCDS Analysis

| TEST | RESULTS AS RECEIVED | RESULTS DRY WEIGHT |
|---|---|---|
| Crude Protein (%) | 7.34 | 21.94 |
| Crude Fat (%) | 1.68 | 5.02 |
| Crude Fiber (%) | 0.96 | 2.87 |
| Nitrogen Converstion (%) | 1.17 | 3.51 |
| Total Digestible Nutrients (%) | 25.10 | 75.06 |
| Net Energy - Lactation (Mcal/l) | 0.26 | 0.78 |
| Net Energy - Maintenance (Mcal) | 0.27 | 0.80 |
| Digestible Energy (Mcal/lb) | 0.50 | — |
| Matabolizable Energy (Mcal/lb) | 0.46 | 1.37 |
| Net Energy - Gain (Mcal/lb) | 0.18 | 0.54 |
| Calcium (ppm) | 441 | 1320 |
| Copper (ppm) | 2.5 | 7.5 |
| Iron (ppm) | 27 | 82 |
| Magnesium (ppm) | 2483 | 7424 |
| Manganese (ppm) | 7.8 | 23 |
| Phosphorous (ppm) | 4764 | 14244 |
| Potassium (ppm) | 8221 | 24580 |
| Sodium (ppm) | 1134 | 3391 |
| Sulfur (ppm) | 4679 | 13990 |
| Zinc (ppm) | 29 | 86 |
| Non-protein Nitrogen (%) | 0.45 | 1.34 |
| Total Starch (%) | 0.41 | 1.21 |

TABLE 3

Liquid Feed CCDS Analysis

| TEST | RESULTS AS RECEIVED | RESULTS DRY WEIGHT |
|---|---|---|
| Moisture (%) | 63.49 | — |
| Dry Matter (%) | 36.51 | — |
| Crude Protein (%) | 8.66 | 23.71 |
| Acid Hydrolysis Fat (%) | 4.49 | 12.31 |
| Phosphorous (ppm) | 4764 | 14244 |
| Sulfur (ppm) | 4679 | 13990 |

One exemplary embodiment of combined liquid feed CCDS and CDWS had the chemical analysis provided by Table 4.

TABLE 4

Liquid Feed CCDS & CDWS Analysis

| TEST | RESULTS AS RECEIVED | RESULTS DRY WEIGHT |
|---|---|---|
| Moisture (%) | 77.89 | — |
| Dry Matter (%) | 22.11 | — |
| Ash (%) | 1.83 | 8.29 |
| Crude Protein (%) | 5.61 | 25.38 |
| Crude Fat (%) | 2.22 | 10.03 |
| Crude Fiber (%) | 0.89 | 4.01 |
| Total Digestible Nutrients (%) | 16.60 | 75.05 |
| Net Energy - Lactation (Mcal/l) | 0.17 | 0.78 |
| Net Energy - Maintenance (Mcal) | 0.18 | 0.80 |
| Digestible Energy (Mcal/lb) | 0.33 | 1.50 |
| Matabolizable Energy (Mcal/lb) | 0.30 | 1.36 |
| Net Energy - Gain (Mcal/lb) | 0.12 | 0.54 |
| Calcium (ppm) | 154 | 697 |
| Copper (ppm) | 1.9 | 8.6 |
| Iron (ppm) | 18 | 80 |
| Magnesium (ppm) | 1529 | 6914 |
| Manganese (ppm) | 4.0 | 18 |
| Phosphorous (ppm) | 3175 | 14357 |
| Potassium (ppm) | 5142 | 23252 |
| Sodium (ppm) | 805 | 3639 |
| Sulfur (ppm) | 2253 | 10188 |
| Zinc (ppm) | 7.4 | 34 |
| Non-protein Nitrogen (%) | 0.28 | 1.29 |
| Nitrogen Conversion (%) | 0.90 | 4.06 |
| Total Starch (%) | 0.40 | 1.79 |

The disclosure expressly includes compositions comprising a disclosed combination of CCDS and CDWS as a component of feed or feedstock. The feed or feedstock may further contain one or more additional feed or feedstock components as known to a person of ordinary skill in the art. The additional component(s), however, will not be either CCDS or CDWS that changes the disclosed ratio between these two ingredients.

Using an exemplary disclosed combination of 30% CCDS and 70% CDWS (in Table 1) as a non-limiting example, Table 5 provides non-limiting examples of possible feed or feedstock formulations (Frm) of the disclosure.

TABLE 5

| | Frm 1 | Frm 2 | Frm 3 | Frm 4 | Frm 5 | Frm 6 | Frm 7 | Frm 8 | Frm 9 | Frm 10 | Frm 11 |
|---|---|---|---|---|---|---|---|---|---|---|---|
| Percentage of 30% CCDS/ 70% CDWS | 20 | 25 | 30 | 35 | 40 | 45 | 50 | 55 | 60 | 65 | 70 |
| Percentage of other feed component(s) | 80 | 75 | 70 | 65 | 60 | 55 | 50 | 45 | 40 | 35 | 30 |

The disclosure further provides other combinations of CCDS and CDWS. The ratios may range from about 20% CCDS and 80% about CDWS to about 30% CCDS and about 70% CDWS, inclusive of the end points and all weight ratios within this range; or about 25% CCDS and about 75% CDWS to about 35% CCDS and about 65% CDWS, inclusive of the end points and all weight ratios within this range; or about 30% CCDS and about 70% CDWS to about 40% CCDS and about 60% CDWS, inclusive of the end points and all weight ratios within this range; or about 35% CCDS and about 65% CDWS to about 5% CCDS and about 55% CDWS, inclusive of the end points and all weight ratios within this range. Additional representative examples include ratios that range from about 20% CCDS and about 80% CDWS to about 25% CCDS and about 75% CDWS, inclusive of the end points and all weight ratios within this range; or about 25% CCDS and about 75% CDWS to about 30% CCDS and about 70% CDWS, inclusive of the end points and all weight ratios within this range; or about 30% CCDS and about 70% CDWS to about 35% CCDS and about 65% CDWS, inclusive of the end points and all weight ratios within this range; or about 35% CCDS and about 65% CDWS to about 40% CCDS and about 60% CDWS, inclusive of the end points and all weight ratios within this range; or about 40% CCDS and about 60% CDWS to about 45% CCDS and about 55% CDWS, inclusive of the end points and all weight ratios within this range.

Additional feed components for use in the practice of the disclosure, and as known to a person of ordinary skill in the art, include dry materials, wet materials, and liquids. Non-limiting examples include wheat, soybean, soybean meal, whey powder, corn, fish meal, fish oil, soybean oil, corn oil, limestone, one or more amino acids, vitamins, therapeutics, minerals and dicalcium phosphate.

C. Embodiments of a Method for Using Disclosed Compositions

The disclosure provides exemplary embodiments of a method for administering nutrition to livestock. Non-limiting examples of suitable livestock include pigs, cattle, bison, sheep, goats and poultry, such as chicken, geese, and ducks, as non-limiting examples.

A first disclosed embodiment includes oral administration of a disclosed composition. In some embodiments, the method may further include repeating the administration one or more times. In some cases, the repeated administration(s) may be with the same disclosed composition. Non-limiting examples include one of the formulations indicated in Table 5. In other cases, the repeated administration(s) is with one or more different compositions. Non-limiting examples of a subsequent composition that may be different from a previous composition are shown in Table 5.

In other embodiments, the administration may be continuous for a period of time with the same or substantially the same formulation. Non-limiting examples include about 30 minutes or longer, about 1 hour or longer, about 2 hours or longer, about 3 hours or longer, about 4 hours or longer, about 5 hours or longer, about 6 hours or longer, about 7 hours or longer, about 8 hours or longer, about 9 hours or longer, or about 10 hours or longer. A repeat administration may be with the same or substantially the same composition or a different composition as described above.

A second disclosed embodiment includes oral administration of CCDS and CDWS to livestock, wherein the administration provides to the livestock a ratio of CCDS and CDWS that ranges from 20% CCDS and 80% CDWS to 45% CCDS and 55% CDWS, inclusive of the end points and all weight ratios within this range. In some cases, the administration occurs over a period of about 30 minutes or less, about 1 hour or less, about 2 hours or less, about 3 hours or less, about 4 hours or less, about 5 hours or less, about 6 hours or less, about 7 hours or less, about 8 hours or less, about 9 hours or less, or about 10 hours or less.

In yet other disclosed embodiments, two or more compositions are administered that, over the course of the administration, provide a ratio of CCDS and CDWS that ranges from 20% CCDS and 80% CDWS to 45% CCDS and 55% CDWS, inclusive of the end points and all weight ratios within this range, and as disclosed herein (see for example Tables 1 and 2).

As a non-limiting example, a first composition comprising CCDS and CDWS may be administered at a first ratio and a second composition comprising CCDS and CDWS administered at a second ratio different from the first ratio. In some cases, the first and second compositions are administered sequentially. In other cases, administration of the two compositions may be interrupted. As a non-limiting example, administration may be over about 1 hour, with the first composition administered for about 30 minutes followed by no administration of any additional consumables, or administration of water or another preparation before administration of the second composition that occurs over a suitable period, such as about 30 minutes.

In some cases, the first and second compositions are selected from the compositions disclosed herein. In other cases, the first ratio of CCDS and CDWS is within the range from about 20% CCDS and about 80% CDWS to about 30% CCDS and about 70% CDWS, inclusive of the end points all weight ratios within this range; and the second ratio is within the range from about 35% CCDS and about 65% CDWS to about 45% CCDS and 55% CDWS, inclusive of the end points and all weight ratios within this range. In some embodiments, the first ratio of CCDS and CDWS is within the range from about 25% CCDS and about 75% CDWS to about 30% CCDS and about 70% CDWS, inclusive of the end points all weight ratios within this range; and the second ratio is within the range from about 35% CCDS and about 65% CDWS to about 40% CCDS and about 60% CDWS, inclusive of the end points and all weight ratios within this range.

D. Embodiments of a Method for Making Disclosed Compositions

The disclosure further provides methods for preparing a disclosed composition. The method may include combining CCDS and CDWS to a ratio, of CCDS and CDWS, that ranges from about 20% CCDS and about 80% CDWS to about 45% CCDS and about 55% CDWS, inclusive of the end points and all weight ratios within this range. In some embodiments, the method prepares a mixture according to Table 1 herein. In other embodiments the method prepares a composition wherein the ratio is from about 20% CCDS and about 80% CDWS to about 30% CCDS and about 70% CDWS, inclusive of the end points and all weight ratios within this range; or about 25% CCDS and about 75% CDWS to about 35% CCDS and about 65% CDWS, inclusive of the end points and all weight ratios within this range; or about 30% CCDS and about 70% CDWS to about 40% CCDS and about 60% CDWS, inclusive of the end points and all weight ratios within this range; or about 35% CCDS and about 65% CDWS to about 45% CCDS and about 55% CDWS, inclusive of the end points and all weight ratios within this range.

Alternatively, the resulting composition has a combination with a ratio from about 20% CCDS and about 80% CDWS to about 25% CCDS and about 75% CDWS, inclusive of the end points and all weight ratios within this range; or about 25% CCDS and about 75% CDWS to about 30% CCDS and about 70% CDWS, inclusive of the end points and all weight ratios within this range; or about 30% CCDS and about 70% CDWS to about 35% CCDS and about 65% CDWS, inclusive of the end points and all weight ratios within this range; or about 35% CCDS and about 65% CDWS to about 40% CCDS and about 60% CDWS, inclusive of the end points and all weight ratios within this range;

Treatment 4: graded levels of CCDS+graded levels of CDWS+graded levels of "dry mix" for different growth phases as indicated below in Table 6.

TABLE 6

Inclusion Levels of CCDS, CDWS and "Dry Mix" for Treatment 4 (air-dry basis)

| Phase | 1 | 2 | 3 | 4 | 5 | 6 | 7 |
|---|---|---|---|---|---|---|---|
| Body Weight (lb) | 30-50 | 50-80 | 80-110 | 110-140 | 140-180 | 180-220 | 220- 270 |
| CCDS (%) | 10.50 | 14.00 | 17.50 | 17.50 | 17.50 | 19.25 | 21.00 |
| CDWS (%) | 19.50 | 26.00 | 32.50 | 32.50 | 32.50 | 35.75 | 39.00 |
| CCDS + CDWS (%) | 30 | 40 | 50 | 50 | 50 | 55 | 60 |
| "Dry Mix" (%) | 70 | 60 | 50 | 50 | 50 | 45 | 40 |
| Total (%) | 100 | 100 | 100 | 100 | 100 | 100 | 100 | or about 40% CCDS and about 60% CDWS to about 45% CCDS and about 55% CDWS, inclusive of the end points and all weight ratios within this range.

Having now generally described exemplary embodiments, the same will be more readily understood by reference to the following examples. These examples are provided for illustration, and do not limit the disclosure to the particular features described for each example.

E. Examples

Example 1—Palatability

Compositions comprising a combination of CCDS to CDWS in the ratios disclosed herein were administered by liquid feeding to swine. The presence of CCDS at 40% to 45% of the combination becomes increasingly detrimental to palatability, and CCDS over 45% is very detrimental. This is consistent with the observation that administration of CCDS alone is not palatable to swine.

Example 2—Separation

Compositions comprising a combination of CCDS to CDWS in the ratios disclosed herein were prepared. The presence of CDWS at 75% to 80% of the combination increases the separation of solid materials from the combination. Over 80%, and the solid material separates rapidly and very noticeably, which reduces the consistency and flowability of a liquid feed to swine. The use of liquid feeding equipment requires less than 80% CDWS in the combination.

Example 3—Animal Growth Performance and Carcass Characteristics

Animal trials were conducted to assess the effects of administering exemplary disclosed compositions to swine on, for example, growth performance and carcass traits. The test design was as follows.

Treatment 1: control (corn-soybean meal diet).

Treatment 2: 5% CCDS (air-dry basis, i.e. 88% dry matter)+25% CDWS (air-dry basis)+70% "dry mix" as indicated below in Table 6.

Treatment 3: 10.5% CCDS (air-Odry basis, i.e. 88% dry matter)+19.5% CDWS (air-dry basis)+70% "dry mix" as indicated below in Table 6.

Treatment 4: graded levels of CCDS+graded levels of CDWS+graded levels of "dry mix" for different growth phases as indicated below in Table 6.

A liquid feeding system was used to prepare feed for individual troughs and to deliver the feed to the troughs using air pressure. 320 pigs with an initial body weight of approximately 30 pounds were blocked by body weight and gender and allocated to the dietary treatments of Table 6. Each dietary treatment had 8 pens (4 barrow pen and 4 gilt pens) with 10 pigs per pen. Diet compositions for animals of different body weight blocks are provided below in Tables 7-13. Growth performance (average daily gain, average daily feed intake and feed conversion efficiency) and average daily water intake for the 7 phases was determined as provided by Table 14. Carcass traits (carcass weight, carcass yield, fat depth, loin depth, percentage of lean, grade index, and carcass values) also were determined as provided by Table 15. Feed ingredients include corn, soybean meal, CCDS, CDWS, calcium, phosphorous, sulphur and proximate components. Diets were formulated to contain similar levels of metabolic energy and digestible lysine, threonine, and tryptophan treatments.

TABLE 7

Diet Composition for 30-50 Pound Body Weight (Phase 1, air-dry basis)

| Ingredients (%) | Treatment 1 (corn-SBM) | Treatment 2 (1:5) | Treatment 3 (35:65) | Treatment 4 (varied level) |
|---|---|---|---|---|
| Corn | 61.35 | 37.96 | 37.96 | 37.96 |
| Soybean meal (SBM, 47.5%) | 28.00 | 24.25 | 24.25 | 24.25 |
| Corn condensed distillers solubles | — | 5.00 | 10.50 | 10.50 |
| Corn distillers whole stillage | — | 25.00 | 19.50 | 19.50 |
| Whey powder | 3.00 | — | — | — |
| Fish meal | 4.00 | — | — | — |
| Oil | 1.00 | 4.00 | 4.00 | 4.00 |
| Limestone | 0.70 | 1.45 | 1.45 | 1.45 |
| Dicalcium phosphate | 0.80 | 0.85 | 0.85 | 0.85 |
| L-Lysine-HCl | 0.23 | 0.50 | 0.50 | 0.50 |
| DL-Methionine | 0.04 | 0.06 | 0.06 | 0.06 |
| L-Threonine | 0.08 | 0.11 | 0.11 | 0.11 |
| L-Tryptophan | — | 0.02 | 0.02 | 0.02 |
| Salt | 0.30 | 0.30 | 0.30 | 0.30 |
| Vitamin-mineral premix | 0.50 | 0.50 | .050 | 0.50 |
| Total | | 100.00 | 100.00 | 100.00 |

TABLE 8

Diet Composition for 50-80 Pound Body Weight
(Phase 2, air-dry basis)

| Ingredients (%) | Treatment 1 (corn-SBM) | Treatment 2 (1:5) | Treatment 3 (35:65) | Treatment 4 (varied level) |
|---|---|---|---|---|
| Corn | 67.23 | 42.61 | 42.66 | 35.58 |
| Soybean meal (SBM, 47.5%) | 28.50 | 20.50 | 20.50 | 16.85 |
| Corn condensed distillers solubles | — | 5.00 | 10.50 | 14.00 |
| Corn distillers whole stillage | — | 25.00 | 19.50 | 26.00 |
| Oil | 1.00 | 3.80 | 3.80 | 4.50 |
| Limestone | 0.73 | 1.20 | 1.20 | 1.30 |
| Dicalcium phosphate | 1.50 | 0.70 | 0.65 | 0.50 |
| L-Lysine-HCl | 0.18 | 0.35 | 0.35 | 0.40 |
| DL-Methionine | 0.04 | 0.01 | 0.01 | 0.01 |
| L-Threonine | 0.02 | 0.03 | 0.03 | 0.06 |
| L-Tryptophan | — | — | — | — |
| Salt | 0.30 | 0.30 | 0.30 | 0.30 |
| Vitamin-mineral premix | 0.50 | 0.50 | .050 | 0.50 |
| Total | | 100.00 | 100.00 | 100.00 |

TABLE 9

Diet Composition for 80-110 Pound Body Weight
(Phase 3, air-dry basis)

| Ingredients (%) | Treatment 1 (corn-SBM) | Treatment 2 (1:5) | Treatment 3 (35:65) | Treatment 4 (varied level) |
|---|---|---|---|---|
| Corn | 70.43 | 48.35 | 48.43 | 29.95 |
| Soybean meal (SBM, 47.5%) | 25.50 | 15.00 | 15.00 | 12.80 |
| Corn condensed distillers solubles | — | 5.00 | 10.50 | 17.50 |
| Corn distillers whole stillage | — | 25.00 | 19.50 | 32.50 |
| Oil | 1.00 | 3.50 | 3.50 | 4.50 |
| Limestone | 0.80 | 1.20 | 1.30 | 1.60 |
| Dicalcium phosphate | 1.30 | 0.70 | 0.55 | — |
| L-Lysine-HCl | 0.15 | 0.37 | 0.35 | 0.33 |
| DL-Methionine | 0.02 | 0.01 | — | — |
| L-Threonine | — | 0.04 | 0.04 | — |
| L-Tryptophan | — | 0.03 | 0.03 | 0.02 |
| Salt | 0.30 | 0.30 | 0.30 | 0.30 |
| Vitamin-mineral premix | 0.50 | 0.50 | .050 | 0.50 |
| Total | | 100.00 | 100.00 | 100.00 |

TABLE 10

Diet Composition for 110-140 Pound Body Weight
(Phase 4, air-dry basis)

| Ingredients (%) | Treatment 1 (corn-SBM) | Treatment 2 (1:5) | Treatment 3 (35:65) | Treatment 4 (varied level) |
|---|---|---|---|---|
| Corn | 73.10 | 52.72 | 52.45 | 33.95 |
| Soybean meal (SBM, 47.5%) | 23.00 | 11.00 | 11.00 | 8.30 |
| Corn condensed distillers solubles | — | 5.00 | 10.50 | 17.50 |
| Corn distillers whole stillage | — | 25.00 | 19.50 | 32.50 |
| Oil | 0.90 | 3.20 | 3.50 | 5.00 |
| Limestone | 0.75 | 1.20 | 1.20 | 1.48 |
| Dicalcium phosphate | 1.30 | 0.60 | 0.55 | — |
| L-Lysine-HCl | 0.15 | 0.40 | 0.40 | 0.40 |
| DL-Methionine | — | — | — | — |
| L-Threonine | — | 0.04 | 0.04 | 0.03 |
| L-Tryptophan | — | 0.40 | 0.04 | 0.04 |
| Salt | 0.30 | 0.30 | 0.30 | 0.30 |
| Vitamin-mineral premix | 0.50 | 0.50 | .050 | 0.50 |
| Total | | 100.00 | 100.00 | 100.00 |

TABLE 11

Diet Composition for 140-180 Pound Body Weight
(Phase 5, air-dry basis)

| Ingredients (%) | Treatment 1 (corn-SBM) | Treatment 2 (1:5) | Treatment 3 (35:65) | Treatment 4 (varied level) |
|---|---|---|---|---|
| Corn | 76.62 | 55.14 | 54.97 | 36.77 |
| Soybean meal (SBM, 47.5%) | 20.00 | 9.00 | 9.00 | 5.60 |
| Corn condensed distillers solubles | — | 5.00 | 10.50 | 17.50 |
| Corn distillers whole stillage | — | 25.00 | 19.50 | 32.50 |
| Oil | 0.60 | 3.00 | 3.20 | 5.00 |
| Limestone | 0.85 | 1.20 | 1.20 | 1.40 |
| Dicalcium phosphate | 1.00 | 0.45 | 0.40 | — |
| L-Lysine-HCl | 0.13 | 0.35 | 0.35 | 0.38 |
| DL-Methionine | — | — | — | — |
| L-Threonine | — | 0.03 | 0.05 | 0.02 |
| L-Tryptophan | — | 0.30 | 0.30 | 0.30 |
| Salt | 0.30 | 0.30 | 0.30 | 0.30 |
| Vitamin-mineral premix | 0.50 | 0.50 | .050 | 0.50 |
| Total | | 100.00 | 100.00 | 100.00 |

TABLE 12

Diet Composition for 180-220 Pound Body Weight
(Phase 6, air-dry basis)

| Ingredients (%) | Treatment 1 (corn-SBM) | Treatment 2 (1:5) | Treatment 3 (35:65) | Treatment 4 (varied level) |
|---|---|---|---|---|
| Corn | 78.90 | 56.44 | 56.25 | 35.32 |
| Soybean meal (SBM, 47.5%) | 18.00 | 8.00 | 8.00 | 2.20 |
| Corn condensed distillers solubles | — | 5.00 | 10.50 | 19.25 |
| Corn distillers whole stillage | — | 25.00 | 19.50 | 35.75 |
| Oil | 0.50 | 3.00 | 3.20 | 5.00 |
| Limestone | 0.85 | 1.20 | 1.25 | 1.30 |
| Dicalcium phosphate | 0.90 | 0.30 | 0.20 | — |
| L-Lysine-HCl | 0.05 | 0.23 | 0.25 | 0.33 |
| DL-Methionine | — | — | — | — |
| L-Threonine | — | 0.01 | 0.03 | 0.02 |
| L-Tryptophan | — | 0.02 | 0.02 | 0.03 |
| Salt | 0.30 | 0.30 | 0.30 | 0.30 |
| Vitamin-mineral premix | 0.50 | 0.50 | .050 | 0.50 |
| Total | | 100.00 | 100.00 | 100.00 |

TABLE 13

Diet Composition for 180-220 Pound Body Weight (Phase 7, air-dry basis)

| Ingredients (%) | Treatment 1 (corn-SBM) | Treatment 2 (1:5) | Treatment 3 (35:65) | Treatment 4 (varied level) |
|---|---|---|---|---|
| Corn | 82.07 | 57.83 | 57.62 | 32.32 |
| Soybean meal (SBM, 47.5%) | 15.50 | 7.00 | 7.00 | — |
| Corn condensed distillers solubles | — | 5.00 | 10.50 | 21.00 |
| Corn distillers whole stillage | — | 25.00 | 19.50 | 39.90 |
| Oil | 0.23 | 3.00 | 3.20 | 5.50 |
| Limestone | 0.80 | 1.20 | 1.20 | 1.10 |
| Dicalcium phosphate | 0.60 | — | — | — |
| L-Lysine-HCl | 0.00 | 0.15 | 0.15 | 0.25 |
| DL-Methionine | — | — | — | — |
| L-Threonine | — | — | 0.01 | — |
| L-Tryptophan | — | 0.02 | 0.02 | 0.03 |
| Salt | 0.30 | 0.30 | 0.30 | 0.30 |
| Vitamin-mineral premix | 0.50 | 0.50 | .050 | 0.50 |
| Total | 100.00 | 100.00 | 100.00 | 100.00 |

The results of these feed treatments are shown below in Tables 14-15.

TABLE 14

Growth Performance (Initial BW as a Covarient)

| | Treatment 3 | Treatment 2 | Treatment 3 | Treatment 4 | SEM | P Value |
|---|---|---|---|---|---|---|
| Body weight (lb) | | | | | | |
| Initial BW | 29.6 | 29.9 | 29.9 | 29.7 | 0.8 | 0.9990 |
| Day 28 on trial | 76.8 | 76.5 | 76.7 | 75.4 | 0.8 | 0.6129 |
| Day 84 on trial | 187.0 A | 176.5 B | 176.2 B | 173.8 B | 2.5 | 0.0042 |
| Day 103 on trial | 233.3 A | 207.8 B | 219.7 B | 217.0 B | 2.6 | 0.0002 |
| Day 117 on trial | 263.7 A | 248.6 B | 250.1 B | 250.4 B | 2.9 | 0.0025 |
| Day 126 on trial (final BW) | 285.2 A | 264.5 B | 266.7 B | 266.2 B | 3.0 | 0.0001 |
| Day 126 on trial (final BW, all pigs) (including 32 pigs for sensory evaluation) | 281.9 A | 264.0 B | 266.1 B | 265.9 B | 2.7 | 0.0002 |
| Average daily gain (ADG, lb/d) | | | | | | |
| Day 1-28 | 1.687 | 1.662 | 1.669 | 1.633 | 0.0286 | 0.6129 |
| Day 28-84 | 1.957 S | 1.785 B | 1.777 B | 1.756 B | 0.0444 | 0.0079 |
| Day 84-103 | 2.441 A | 2.179 B | 2.290 AB | 2.273 AB | 0.0513 | 0.0114 |
| Day 103-117 | 2.172 B | 2.194 B | 2.166 B | 2.390 A | 0.0425 | 0.0022 |
| Day 117-126 | 2.357 A | 1.782 B | 1.869 B | 1.737 B | 0.0672 | <0.0001 |
| Day 117-126 (all pigs) | 2.106 A | 1.838 AB | 1.910 AB | 1.799 B | 0.0707 | 0.0235 |
| Day 1-126 | 2.027 A | 1.862 B | 1.880 B | 1.876 B | 0.0236 | 0.0001 |
| Day 1-126 (all pigs) | 2.009 A | 1.867 B | 1.883 B | 1.881 B | 0.0213 | 0.0002 |
| Average daily feed intake (lb/d) (ADFI, dry matter basis) | | | | | | |
| Day 1-28 | 2.548 | 2.822 | 2.804 | 2.760 | 0.0735 | 0.0503 |
| Day 28-84 | 4.919 | 5.109 | 4.962 | 4.990 | 0.0659 | 0.2293 |
| Day 84-103 | 7.534 B | 7.695 A | 7.433 C | 7.433 C | 0.0021 | <0.0001 |
| Day 103-117 | 8.523 B | 8.555 A | 8.392 D | 8.415 C | 0.0022 | <0.0001 |
| Day 117-126 | 8.679 B | 8.710 A | 8.610 D | 8.651 C | 0.0031 | <0.0001 |
| Day 117-126 (all pigs) | 8.966 B | 8.982 A | 8.878 D | 8.921 C | 0.0030 | <0.0001 |
| Day 1-126 | 5.504 B | 5.677 A | 5.543 B | 5.552 AB | 0.0335 | 0.0067 |
| Day 1-126 (all pigs) | 5.485 B | 5.659 A | 5.524 B | 5.533 AB | | 0.0069 |
| ADG/ADFI | | | | | | |
| Day 1-28 | 0.665 A | 0.591 B | 0.597 B | 0.593 B | 0.0105 | <0.0001 |
| Day 28-84 | 0.401 A | 0.349 B | 0.358 B | 0.352 B | 0.0087 | 0.0007 |
| Day 84-103 | 0.324 A | 0.283 B | 0.308 AB | 0.306 AB | 0.0069 | 0.0028 |
| Day 103-117 | 0.255 B | 0.257 B | 0.258 B | 0.284 A | 0.005 | 0.0008 |
| Day 117-126 | 0.272 A | 0.205 B | 0.217 B | 0.201 B | 0.0078 | <0.0001 |
| Day 117-126 (all pigs) | 0.235 A | 0.205 AB | 0.215 AB | 0.202 B | 0.0079 | 0.0284 |
| Day 1-126 | 0.368 A | 0.328 B | 0.339 B | 0.338 B | 0.0039 | <0.0001 |
| Day 1-126 (all pigs) | 0.366 A | 0.330 B | 0.341 B | 0.340 B | 0.0036 | <0.0001 |

TABLE 15

| | Treatment | Slaughter B (lb) | Total Carcass Weight (lb) | Dressing (%) | Fat Depth (inch) | Muscle Depth (inch) | Lean (%) |
|---|---|---|---|---|---|---|---|
| | 1 | 284.9 A | 212.9 A | 74.7 | 0.86 | 2.67 | 54.17 |
| | 2 | 264.6 B | 198.1 B | 74.84 | 0.78 | 2.58 | 54.32 |
| | 3 | 266.9 B | 199.1 B | 74.63 | 0.77 | 2.59 | 54.40 |
| | 4 | 266 B | 201.4 AB | 75.66 | 0.77 | 2.59 | 54.44 |
| P value | | 0.0029 | 0.0122 | 0.1092 | 0.0304 | 0.1435 | 0.8541 |

The growth performance and carcass data presented above for these animal trials establish that the exemplary CCDS and CDWS compositions disclosed herein can be used beneficially to feed animals, particularly swine. These compositions can be used to replace, or in combination with, standard diets to obtain substantially similar animal growth performance and carcass data, but at a substantially reduced cost.

All references cited herein, including patents, patent applications, and publications, are hereby incorporated by reference in their entireties, whether previously specifically incorporated or not.

Having now fully described the inventive subject matter, it will be appreciated by those of ordinary skill in the art that the same can be performed within a wide range of equivalent parameters, concentrations, and conditions without departing from the spirit and scope of the disclosure and without undue experimentation.

While this disclosure has been described in connection with specific embodiments thereof, it will be understood that it is capable of further modifications. This application is intended to cover any variations, uses, or adaptations of the disclosure following, in general, the principles of the disclosure and including such departures from the present disclosure as come within known or customary practice within the art to which the disclosure pertains and as may be applied to the essential disclosed features.

We claim:

1. A method of providing nutrition to a porcine, the method comprising providing to the porcine by liquid feed administration a composition comprising a combination of corn condensed distillers' soluble (CCDS) and corn distillers' whole stillage (CDWS) in a ratio within the range of from 20% CCDS and 80% CDWS and 45% CCDS and 55% CDWS.

2. The method according to claim 1 comprising orally administering the composition to the porcine.

3. The method according to claim 1, comprising:
administering a first composition comprising CCDS and CDWS at a first ratio; and
administering a second composition comprising CCDS and CDWS at a second ratio different from the first ratio.

4. The method according to claim 3, wherein:
the first ratio of CCDS and CDWS is within the range from 20% CCDS and 80% CDWS to 30% CCDS and 70% CDWS, inclusive; and
the second ratio is within the range from 35% CCDS and 65% CDWS to 45% CCDS and 55% CDWS, inclusive.

5. The method according to claim 3, wherein:
the first ratio of CCDS and CDWS is within the range from 25% CCDS and 75% CDWS to 30% CCDS and 70% CDWS, inclusive; and
the second ratio is within the range from 35% CCDS and 65% CDWS to 40% CCDS and 60% CDWS, inclusive.

6. A method of preparing a composition for liquid feed administration to a porcine, the method comprising combining corn condensed distillers' soluble (CCDS) and corn distillers' whole stillage (CDWS) to provide a ratio of CCDS and CDWS within the range of from about 20% CCDS to about 80% CDWS to about 45% CCDS and about 55% CDWS.

7. The method according to claim 6, further comprising adding an additional feed component to the composition, the additional feed component being selected from corn, soybean, barley, wheat, meals, whey, fish meal, fish oil, soybean oil, corn oil, limestone, dried distillers' grain, potato mash, beer, sugar cane water, restaurant waste, ice cream, vitamins, minerals, dicalcium phosphate, amino acids, therapeutics, growth promotants, and combinations thereof.

8. The method according to claim 6, wherein the ratio of CCDS and CDWS ranges from 20% CCDS and 80% CDWS to 30% CCDS and 70% CDWS, inclusive.

9. The method according to claim 6 wherein CCDS and CDWS are combined in a weight or a volume ratio.

10. The method according to claim 1, comprising:
forming a mixture comprising corn condensed distillers' soluble (CCDS) and corn distillers' whole stillage (CDWS); and
administering the mixture comprising CCDS and CDWS to the porcine using a liquid feeding system.

11. The method according to claim 1, comprising:
forming a mixture comprising corn condensed distillers' soluble (CCDS) and corn distillers' whole stillage (CDWS);
combining the mixture with at least one additional feed material or nutrient to form a mixed composition; and
administering the mixed composition to the porcine using a liquid feeding system.

12. The method according to claim 6, wherein the ratio of CCDS and CDWS ranges from or 25% CCDS and 75% CDWS to 35% CCDS and 65% CDWS, inclusive.

13. The method according to claim 6, wherein the ratio of CCDS and CDWS ranges from 30% CCDS and 70% CDWS to 40% CCDS and 60% CDWS, inclusive.

14. The method according to claim 6, wherein the ratio of CCDS and CDWS ranges from 35% CCDS and 65% CDWS to 45% CCDS and 55% CDWS, inclusive.

15. The method according to claim 1 comprising, prior to providing the composition to a porcine, mixing CCDS with CDWS.

16. The method according to claim 1 wherein the ratio is a weight ratio or a volume ratio.

17. The method according to claim 1 wherein the ratio is a weight ratio.

18. The method according to claim 1 wherein the composition comprises at least one additional feed or nutritional component.

19. The method according to claim 1 wherein the composition comprises at least one additional feed component selected from corn, soybean, barley, wheat, meals, whey, fish meal, fish oil, soybean oil, corn oil, limestone, dried distillers' grain, potato mash, beer, sugar cane water, restaurant waste, ice cream, vitamins, minerals, dicalcium phosphate, amino acids, therapeutics, growth promotants, and any and all combinations thereof.

20. The method according to claim 1 wherein the composition comprises at least one additional dry material.

* * * * *